Figure 1:
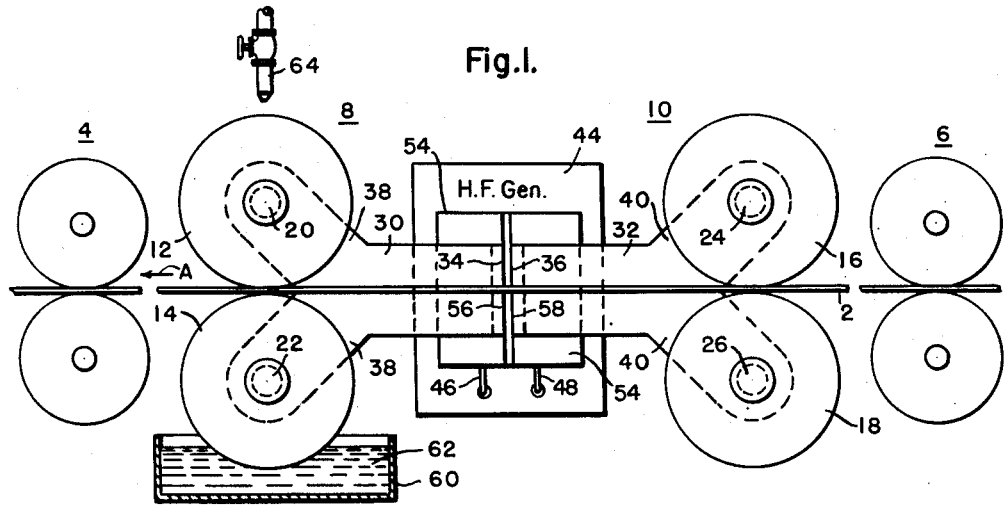

May 25, 1954   M. E. WADE   2,679,574
CONDUCTION HEATING OF METALLIC STRIP
Filed Sept. 27, 1949

WITNESSES:

INVENTOR
Marion E. Wade.
BY
ATTORNEY

Patented May 25, 1954

2,679,574

UNITED STATES PATENT OFFICE 2,679,574

CONDUCTION HEATING OF METALLIC STRIP

Marion E. Wade, Kansas City, Kans., assignor to Westinghouse Electric Corporation, East Pittsburgh, Pa., a corporation of Pennsylvania Application September 27, 1949, Serial No. 118,161

9 Claims. (Cl. 219—10.61)

My invention relates to the selective heating of a longitudinal band of strip; but more particularly my invention is directed to the heat treatment of the teeth of a hacksaw blade or band saw blade for the purpose of hardening them, the hardening being confined to the tooth-region of the saw blade.

In the Pavitt Patent No. 2,326,674, dated August 10, 1943, it has been proposed to heat-treat the teeth of a saw blade for hardening. The apparatus described utilizes high-frequency current passing through an induction heating coil. The teeth of the saw blade pass between a pair of spaced turns of the induction heating coil, and so are heated inductively to the desired temperature. Thereafter the heated teeth are quenched. However, the construction described in this patent concentrates the heating in a relatively short heating-zone.

An object of my invention is to provide high-frequency apparatus for the hardening of saw teeth, the apparatus permitting the saw blade to be moved continuously, but the apparatus being so constructed that the length of the heating-zone can be as long or as short as desired, the particular length being a matter of choice and design. To this end, I provide a structure that makes use of the proximity and conduction effects of high-frequency current. Such effects are known to the art, as typified by the Bennett Patent No. 2,066,668, dated January 5, 1937.

My preferred construction provides a plurality of sets of rollers through which an elongated saw blade passes. A pair of the roller-sets can be spaced any desired distance to provide a heating-zone of a corresponding or shorter length. High-frequency conductors extend for substantially the length of the zone and lie close to, or in proximity to, the path in which the saw teeth progress. The conductors are preferably connected to the spaced roller-sets so that high-frequency current also flows through the saw blade. The proximity effect forces the current to a longitudinal portion of the saw blade, at the teeth. Any suitable quenching means, preferably a set of rollers at the strip-leaving end of the heating-zone may be used to apply a quench liquid to the heated part of the saw blade.

Figure 2:
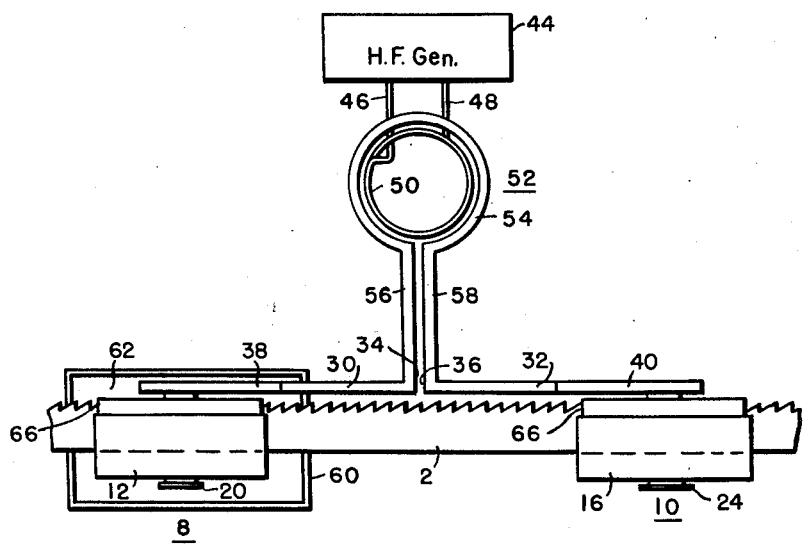

Objects, features and innovations of my invention, in addition to the foregoing, will be discernible from the following description of a preferred embodiment to which the broadest aspects of my invention are not necessarily limited. The description is to be taken in conjunction with the accompanying drawing showing, in a simplified manner, the preferred embodiment of my invention. In the drawing:

Figure 1 is a broadside elevational view of apparatus in accordance with my invention; and Fig. 2 is a plan view thereof.

In accordance with my invention, an elongated metallic strip in the form of a saw blade 2 is moved longitudinally, or in the direction of its length, by any suitable means represented in Fig. 1 by a pull unit 4 and a drag unit 6. By means of such units the tension in the blade can also be controlled as it progresses, preferably at a uniform speed in a flat plane, in the direction of the arrow A. Suitable spaced strip-guiding means are provided for guiding or confining at least a portion of the traveling strip or blade 2 along a pre-set path. Such strip-guiding means are represented at 8 and 10.

The strip-guiding means 8 and 10 comprise a set of rollers 12 and 14, and a set of rollers 16 and 18, respectively. The rollers 12 and 14 are rotatably carried on parallel horizontal shafts 20 and 22, respectively, and are arranged so that their facing surfaces are generally in engagement with the surfaces of the blade 2 thereat; and to this end one or both of the shafts can be spring mounted or otherwise mounted so as to press toward the other shaft. The rollers 16 and 18 are similarly constructed, and their parallel horizontal shafts are indicated at 24 and 26, respectively.

In the embodiment herein described, the particular strip-guiding means 8 and 10 are also current-transferring means through which high-frequency current is supplied to the portion of the saw blade 2 that lies between them, so that the high-frequency current will flow from one of the current-transferring means, or strip-guiding means, to the other current-transferring means, or strip-guiding means. To this end, the rollers and their associated shafts, comprising the strip-guiding means, are associated with conductor means which extend for substantially the length of the path between them, and are disposed in close proximity to the upper longitudinal edge of the saw blade 2 in such path. More specifically the conductor means comprises a metallic plate 30 that spans a portion of the path in which the teeth of the saw blade 2 pass, and a second metallic plate 32 that similarly spans any remaining portion of such path in the heating-zone. These plates 30 and 32 are in line and have facing edges 34 and 36, respectively, which are suitably spaced for insulation purposes. The other edges of the plates are conductively associated with one or both of the guiding means 8 and 10, respectively. Such conductive association can be obtained by providing the plate 30 with one or more arms 38 which are secured to one or both of the shafts 20 and 22; and providing the plate 32 with one or more arms 40 which are secured to one or both of the shafts 24 and 26. Consequently, the conductor means, the sets of rollers and the blade-portion between the sets of rollers form a circuit which can conduct high-frequency current.

The high-frequency current can be derived from any suitable supply such as a high-frequency generator 44 having output supply conductors 46 and 48 which are connected across turns of a primary 50 of a high-frequency transformer 52. The secondary 54 of the transformer 52 is provided with output supply conductors 56 and 58 which are connected respectively to the plates 30 and 32, preferably at their edges 34 and 36.

In the operation of the equipment thus far described high-frequency energy, generated in the secondary 54, flows in a circuit which comprises the supply conductor 56, plate 30, one or both of the shafts 20 and 22, one or both of the rollers 12 and 14, the portion of the saw blade 2 that extends from the current-transferring means 8 to the current-transferring means 10, one or both of the rollers 16 and 18, one or both of the shafts 24 and 26, the plate 32 and the other supply conductor 58. The current flowing in the said blade-portion heats it by conduction; and by arranging the conductor plates 30 and 32 suitably close to a longitudinal band of the saw blade 2, this current can be concentrated in this longitudinal band. In the embodiment described, the conductor plates 30 and 32 are near and along the saw blade teeth so that the current is concentrated therein, and will follow the contour thereof. Consequently the heating will be mostly in the teeth of the band saw but the depth of heating can be controlled by the frequency of the power supplied and the speed with which the saw blade moves.

Except for the saw blade, it is preferable to make all of the current-conducting parts of copper so that most of the heating will be confined to the saw blade which is usually of steel and has a higher resistivity as well as higher permeability.

For hardening purposes it is desirable to quench the heated saw blade. To this end the set of rollers at the leaving end of the heating-zone can be arranged to apply quenching liquid to the blade. Any suitable expedient may be used, and that shown comprises a tank 60 holding quenching oil 62 in which the lower roller 14 is partially immersed, and an oil feeding means 64 which feeds quenching liquid to the upper roller 12. The quenching oil serves the additional purpose of cooling the rollers 12 and 14 which are at the hot ends of the heating-zone.

As an additional refinement one or both of the rollers of each of the roller sets have a groove 66 cut in their faces to allow the teeth of the saw blade to pass through without taking the set out of such teeth.

While I have described my invention in a preferred form, it is obvious that it is subject to many different modifications; and the principles of my invention can be extended to other embodiments.

I claim as my invention:

1. Apparatus for heat-treating elongated metallic strip, comprising, in combination, a plurality of spaced roller-means providing a path-portion through which strip can progress, said roller-means being constructed to guide strip through said path-portion, with the strip substantially in electrical contact therewith, a high-frequency source of power, conductors directly connecting said source of power between a pair of said roller-means, said conductors including portions extending close to and along said path-portion.

2. Apparatus for heat-treating elongated metallic strip having an edge comprising substantially linear conductor-means, strip-handling means for passing said strip with its edge substantially parallel to said conductor means, current-supply means connected to said conductor-means for passing high-frequency current through said conductor-means, and current-transfer means electrically fastened to said conductor means and to said strip for passing high-frequency current through the portion of strip facing said conductor means, said current-transfer means including a roller substantially in electrical contact with said strip, said conductor means being positioned sufficiently close to said strip such that the strip is inductively heat-treated by the current passing through said conductor means.

3. Apparatus in accordance with claim 2, in which said current-transfer means include at least a pair of rollers in contact with said strip, with said strip portion being between said pairs of rollers.

4. Apparatus for heat-treating elongated metallic strip, comprising, in combination, a plurality of strip-guiding means providing a path-portion through which strip can progress, said strip-guiding means being in direct electrical connection with said strip and spaced along said path-portion for supplying high-frequency current through said electrical connection to the strip-portion therebetween, and high-frequency supply means in direct electrical connection between said strip-guiding means, said supply means including current-conductors arranged along a side of said path-portion in proximity to said strip therein.

5. Apparatus for heat-treating elongated metallic strip, comprising, in combination, a plurality of strip-guiding means providing a path-portion through which strip can progress, said plurality of strip-guiding means including a plurality of current-transfer means spaced along said path-portion for supplying high-frequency current through a direct electrical connection with the strip-portion therebetween, and high-frequency supply means directly connected to said current-transfer means for supplying high-frequency current to said current-transfer means, said supply means comprising current-conductors arranged along a side of said path-portion in proximity to said strip therein.

6. Apparatus for heat-treating elongated metallic strip comprising conductor-means, strip-handling means for passing said strip with its edge substantially parallel to said conductor means, current supply means for passing high-frequency current through said conductor-means, and a plurality of current-transfer means directly connected to said conductor means and to said strip for passing high-frequency current through the portion of said strip facing said conductor-means and between said current transfer means.

7. Apparatus for heat-treating elongated metallic strip, comprising, in combination, a plurality of spaced roller-means providing a path-portion through which strip can progress, said roller-means being constructed to guide strip through said path-portion, with the strip substantially in electrical contact therewith, a high-frequency source of power, conductors directly connecting said source of power between a pair of said roller-means, said conductors including portions extending substantially parallel to said path-portion and closely adjacent the section of strip within said path portion such that the latter strip section is inductively heat treated by the current carried by said conductors.

8. Heat-treating apparatus of a type described comprising, in combination, a pair of roller-means spaced along a substantially linear path through which strip can move, each roller-means comprising a pair of cooperating rollers arranged to receive the strip between them, a conductor means extending along said path and being in direct electrical connection to said roller-means, for causing high-frequency current to flow from a first of said roller-means, to the second of said roller-means, and along said conductor means, said conductor-means comprising conductors extending substantially parallel to said path-portion, and positioned sufficiently close to the strip-edge in said path-portion that said strip edge is inductively heat treated by the current flowing in said conductors.

9. Heat-treating apparatus of a type described comprising, in combination, a pair of roller-means spaced along a substantially linear path through which strip can move, each roller-means comprising a pair of cooperating rollers arranged to receive the strip between them, a conductor means extending substantially parallel to said path substantially for the distance between said roller-means, high-frequency power supply means including direct electrical connections between said conductor means and said roller-means for causing high-frequency current to flow from a first of said roller-means, along the strip-portion extending between said roller-means, to the second of said roller-means, and along said conductor means, said conductor-means comprising conductors positioned along said path-portion and sufficiently close to the strip-edge in said path-portion such that said strip edge is inductively heat treated by the current flowing in said conductors.

References Cited in the file of this patent

UNITED STATES PATENTS

| Number | Name | Date |
|---|---|---|
| 198,804 | Luttges | Jan. 1, 1878 |
| 337,981 | Mower | Mar. 16, 1886 |
| 1,268,155 | Rowland | June 4, 1918 |
| 1,333,080 | Kobert | Mar. 9, 1920 |
| 1,347,917 | Sheperdson | July 27, 1920 |
| 1,657,643 | Reniers | Jan. 31, 1928 |
| 2,275,274 | Wallace | Mar. 3, 1942 |
| 2,293,534 | Denneen et al. | Aug. 18, 1942 |
| 2,437,776 | Wilson | Mar. 16, 1948 |
| 2,475,348 | Black | July 5, 1949 |
| 2,479,346 | Goodnow | Aug. 16, 1949 |
| 2,583,227 | Neidigh | Jan. 22, 1952 |